(12) United States Patent
Murat

(10) Patent No.: US 9,493,055 B1
(45) Date of Patent: Nov. 15, 2016

(54) ATTACHABLE SECONDARY SUN VISOR

(71) Applicant: Marie Rose Odette Murat, Patterson, NY (US)

(72) Inventor: Marie Rose Odette Murat, Patterson, NY (US)

( * ) Notice: Subject to any disclaimer, the term of this patent is extended or adjusted under 35 U.S.C. 154(b) by 0 days.

(21) Appl. No.: 14/943,174

(22) Filed: Nov. 17, 2015

Related U.S. Application Data

(60) Provisional application No. 62/086,430, filed on Dec. 2, 2014.

(51) Int. Cl.
*B60J 3/02* (2006.01)

(52) U.S. Cl.
CPC ............. *B60J 3/0208* (2013.01); *B60J 3/0217* (2013.01)

(58) Field of Classification Search
CPC ........................... B60J 3/026; B60J 3/300208
USPC .................. 296/97.6, 97.5, 97.8, 97.11, 97.9
See application file for complete search history.

(56) References Cited

U.S. PATENT DOCUMENTS

| | | | | |
|---|---|---|---|---|
| 2,823,950 A | * | 2/1958 | Harris | B60J 3/0208 296/97.6 |
| 2,965,416 A | * | 12/1960 | Dryden | B60J 3/0208 296/97.8 |
| 4,666,205 A | | 5/1987 | Nakagawa | |
| 4,950,021 A | * | 8/1990 | Vandagriff | B60J 3/0208 296/97.11 |
| 5,417,466 A | * | 5/1995 | Giantonio | B60J 3/0208 296/97.6 |
| 5,445,427 A | | 8/1995 | Vandagriff | |
| 5,580,117 A | | 12/1996 | Goclowski | |
| 6,039,381 A | * | 3/2000 | Klauer | B60J 3/0208 296/97.6 |
| 6,189,947 B1 | * | 2/2001 | Annan | B60J 3/0208 296/97.11 |
| 6,776,446 B1 | | 8/2004 | Tutt | |
| 8,215,696 B2 | | 7/2012 | Akiya | |
| 2011/0057471 A1 | | 3/2011 | Lane | |

FOREIGN PATENT DOCUMENTS

| | | |
|---|---|---|
| EP | 0972664 | 1/2000 |
| FR | 2662119 | * 11/1991 |
| WO | WO2005065120 | 7/2005 |

* cited by examiner

*Primary Examiner* — Dennis H Pedder
(74) *Attorney, Agent, or Firm* — Goldstein Law Offices, P.C.

(57) ABSTRACT

A secondary sun visor assembly for use in a vehicle having a windshield, a side window, and a conventional sun visor panel, the assembly including a secondary sun visor panel, a clip, an arm assembly that connects the clip and secondary sun visor panel, and a sliding collar. The arm assembly allows the secondary sun visor panel to selectively store against conventional sun visor panel where it is held in place by the sliding collar, and selectively deploy to a position where the conventional sun visor panel is extended in front of the side window, while the secondary sun visor panel is extended in front of the windshield, to block the sun's rays simultaneously extending through the side window and windshield.

14 Claims, 6 Drawing Sheets

ATTACHABLE SECONDARY SUN VISOR

CROSS REFERENCES AND RELATED SUBJECT MATTER

This application is a non-provisional of provisional patent application Ser. No. 62/086,430, filed in the United States Patent Office on Dec. 2, 2014, which is incorporated by reference herein in its entirety.

TECHNICAL FIELD

The present disclosure relates generally to automobile sun visors. More particularly, the present disclosure relates to a secondary visor that attaches to and works in conjunction with an existing sun visor to provide additional sun glare protection to a vehicle occupant.

BACKGROUND

When operating an automobile, road visibility is essential for safe driving. Many factors can affect visibility, including precipitation, fog, dirt and debris on the windshield, and darkness. Most of these can be overcome by headlights, fog lights, windshield wipers, and windshield washers. The most insidious, dangerous, and difficult to overcome, however, is the blinding light of sun glare.

Sun glare is most problematic while driving during the morning and evening, when the sun is at a low angle in the sky. The bright light of the sun can prevent the driver from seeing other cars or pedestrians in his or her path. It can be continuous, such as while driving westbound in the evening rush hour, or it can be sudden and intermittent, such as when driving on a curvy road and the driver is suddenly face to face with the sun.

The ubiquitous sun visor is a driver's first line of defense. All conventional automobiles include sun visors for the driver and front seat passenger. The conventional sun visor is attached to the vehicle with a stem assembly that allows it to be selectively stored in an upward position, lowered to extend before the windshield, and pivoted to extend by the side window. Since the sun visor is only capable of shielding a small portion of the windshield or side window, the sun visor is most effective when the sun remains at a fixed position relative to the automobile, and shines either completely through the windshield or completely through one of the side windows.

Accordingly, one major limitation of using a conventional sun visor is best realized when the sun is shining partially on the windshield and partially on the side window. In such a case, since the visor cannot be simultaneously deployed both in front of the windshield and on the side window, the blinding sun glare cannot be blocked by the visor.

Various visor extenders and attachments have been devised and attempted by others. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant in an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to effectively block the sun from a driver or passenger when the sun is positioned in a way that exceeds the coverage limit of a conventional sun visor. Accordingly, a secondary sun visor provides additional coverage of the vehicle glass and thereby provides additional blockage of the sun's rays penetrating therethrough.

Another aspect of an example embodiment in the present disclosure is to provide a secondary sun visor that works in conjunction with the existing conventional sun visor in a vehicle. Accordingly the secondary visor assembly may clip directly onto the existing visor.

It is yet another aspect of an example embodiment in the present disclosure to provide a secondary visor that is deployable to a window surface distinct from where the conventional sun visor is deployed. Accordingly, the secondary visor panel is connected to the clip by an arm assembly that allows the secondary visor panel to selectively store against the conventional visor and selectively extend against a distinct window surface. In particular, while the conventional visor is extended by the side window, the secondary visor panel can be pivoted to extend near the windshield.

Accordingly, the present disclosure describes a secondary sun visor assembly for use in a vehicle having a windshield, a side window, and a conventional sun visor panel, the assembly including a secondary sun visor panel, a clip, an arm assembly that connects the clip and secondary sun visor panel, and a sliding collar. The arm assembly allows the secondary sun visor panel to selectively store against the conventional sun visor panel where it is held in place by the sliding collar, and selectively deploy to a position where the conventional sun visor panel is extended in front of the side window, while the secondary sun visor panel is extended in front of the windshield, to block the sun's rays simultaneously extending through the side window and windshield.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
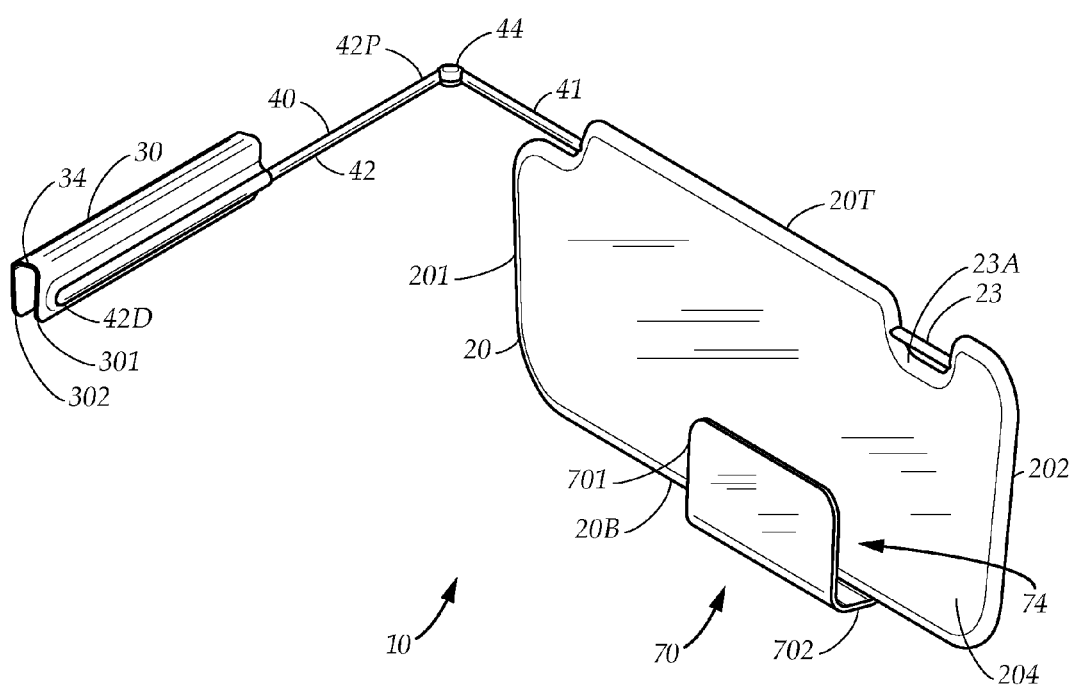
FIG. 1 is a diagrammatic perspective view, illustrating an embodiment of the secondary sun visor, per se.

FIG. 1 illustrates a secondary sun visor assembly 10, including a secondary sun visor panel 20, a clip 30, an arm assembly 40 that connects the clip 30 and secondary sun visor panel 20, and a slidable collar 70 attached to the secondary sun visor panel 20.

The secondary sun visor panel 20 includes a top edge 20T, a bottom edge 20B, a first side 201, and a second side 202. The secondary sun visor panel 20 has an outer covering 204 that is substantially opaque between the top edge 20T, bottom edge 20B, first side 201, and second side 202 so as to effectively block the sun's rays or solar glare incident on the secondary sun visor panel 20 therebetween. The secondary sun visor assembly 10 includes a hooking rod 23, which is a generally cylindrical structure. In the embodiment illustrated in FIG. 1-4 the hooking rod 23 is located near the top edge 20T of the secondary sun visor panel 20, and is preferably provided within an indenture 23A from the top edge 20T.

The arm assembly 40 includes a first arm 41 and a second arm 42. The first arm 41 is connected to the secondary sun visor panel 20, and extends along and is connected to the top edge 20T. The secondary sun visor panel 20 is configured to pivot around the first arm 41, such that the secondary sun visor panel 20 can thereby pivot upwardly and downwardly at its top edge 20T. Note that the first arm 41 and second arm 42 are preferably telescopic, having a plurality of telescoping portions that nest within each other to allow the arms 41, 42 to expand and retract to lengthen and shorten to help fulfill the purposes of the secondary sun visor assembly 10.

The second arm 42 has a proximal end 42P and a distal end 42D. The distal end 42D is attached to the clip 30. A compound hinge 44 attaches the proximal end 42P of the second arm 42 to the first arm 41, and allows the first arm 41 and second arm to selectively extend in positions where they are nearly parallel, and where they are more than ninety degrees apart. The clip 30 includes a first plate 301, a second plate 302, and a longitudinal channel 34 defined by the first plate 301 and second plate 302. The longitudinal channel 34 extends substantially parallel to the second arm 42. Note that the clip 30 is flexible and exerts a spring-like force, such that the longitudinal channel 34 can flex to expand and will exert an inward force as it is expanded. Similarly, the slidable collar 70 has a lip 701, a connecting tab 702, and a longitudinal channel 74 between the lip 701 and secondary sun visor panel 20. Note that the sliding collar 70 is attached along the bottom edge 20B by the connecting tab 702 and can slide laterally therealong, for purposes which will be apparent hereinafter.

Figure 2:
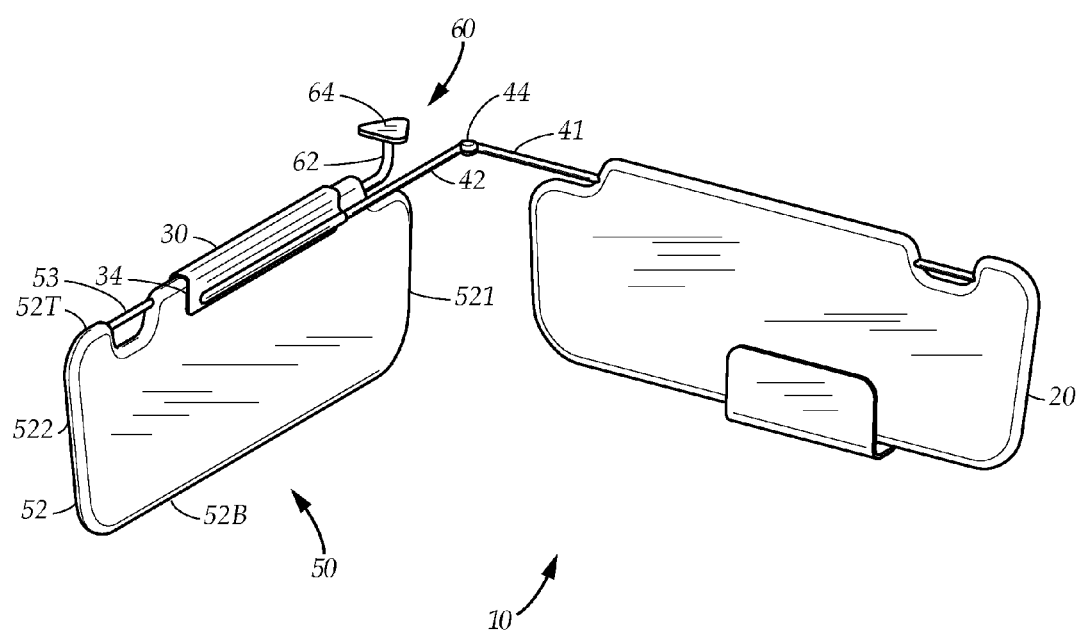
FIG. 2 is a diagrammatic perspective view, illustrating the clip attached to a conventional sun visor, with the secondary sun visor panel pivoted away from the conventional sun visor.

Referring now to FIG. 2, the secondary sun visor assembly 10 is shown in conjunction with a conventional sun visor 50. The conventional sun visor 50 has a conventional sun visor panel 52 having a top edge 52T, a bottom edge 52B, a first side 521, and a second side 522. The conventional sun visor 50 has a stem assembly 60 including a stem bar 62 that extends along the top edge 52T, and a vehicle mount 64. The stem assembly 60 allows the conventional sun visor 50 to swing through a range of motion of more than ninety degrees, and to pivot upwardly and downwardly along the top edge 52T. The conventional sun visor has a hooking rod 53 located along the top edge 52T.

Also illustrated in FIG. 2, the clip 30 is secured over the top edge 52T, such that the top edge 52T extends in the longitudinal channel 34 of the clip 30. The spring force of the panels 301, 302 (FIG. 1) holds the clip and thus the secondary sun visor assembly 10 onto the conventional sun visor panel 52. Note that the hinge 44 has the first arm and second arm at an angle somewhat greater than ninety degrees, thus extending the conventional sun visor panel 52 and secondary sun visor panel 20 at a similar angle (somewhat greater than ninety degrees) with respect to each other.

Figure 3:
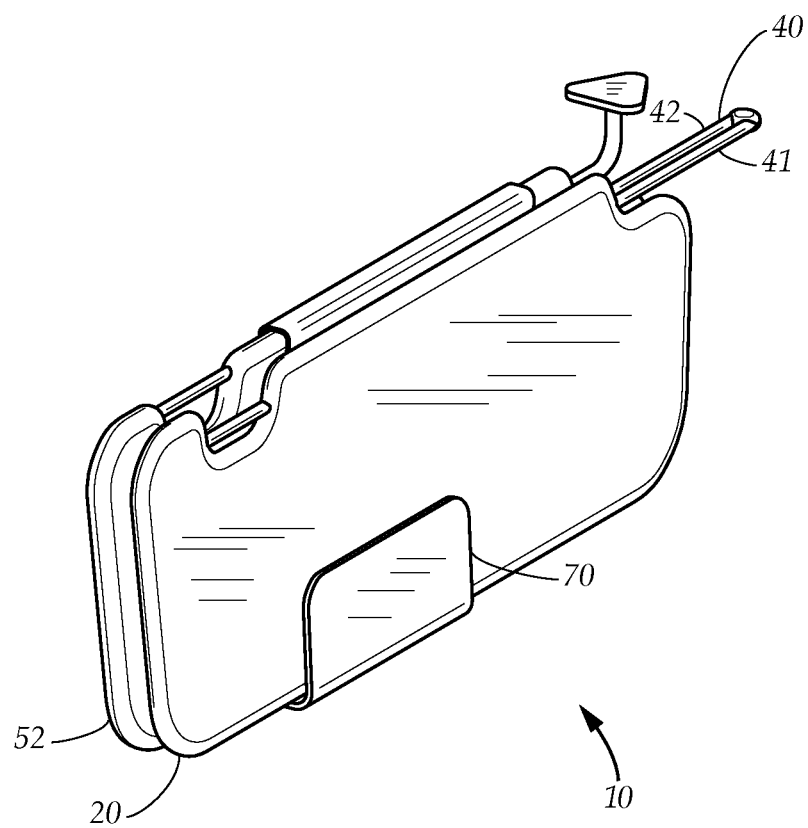
FIG. 3 is a diagrammatic perspective view, illustrating the secondary sun visor panel in a storage position, wherein a slidable collar selectively holds the secondary sun visor panel against the conventional sun visor.

FIG. 3 illustrates the secondary sun visor assembly 10 in a storage position, wherein the secondary sun visor panel 20 is positioned against the conventional sun visor panel 52, extending parallel thereto. Note that the arm assembly 40 is in a storage position, wherein the first arm 41 and second arm 42 extend nearly parallel to each other. The sliding collar 70 holds the secondary sun visor panel 20 to the conventional sun visor panel 52. In this storage position, the conventional sun visor panel 52 can be 'flipped up' into its natural storage position where the secondary sun visor panel 20 can also be stored without being 'in the way'.

Figure 4:
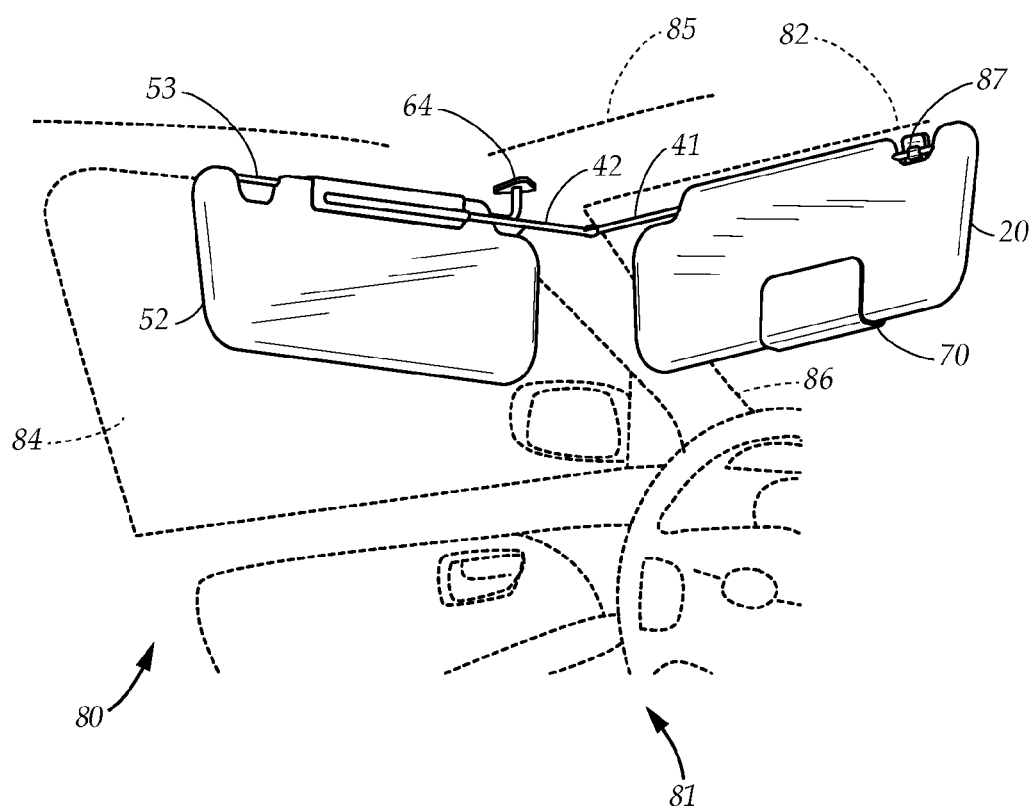
FIG. 4 is a diagrammatic perspective view, illustrating the secondary sun visor in use within a vehicle, wherein the conventional sun visor is positioned against the driver's side window, while the secondary sun visor panel is extended by the windshield.
Figure 5A:
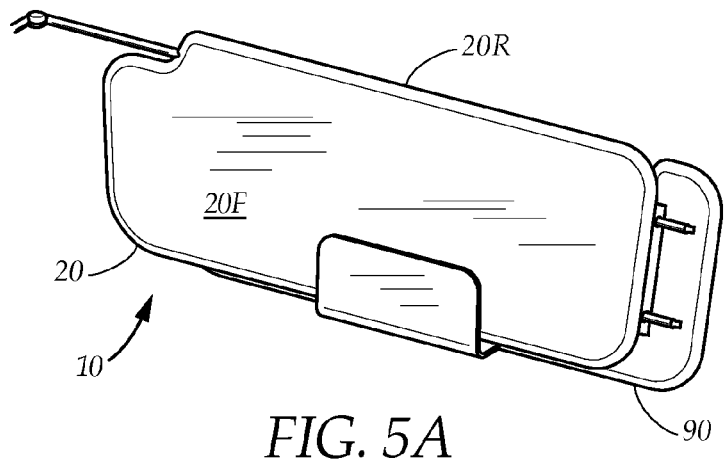
FIG. 5A is a diagrammatic perspective view, illustrating a further embodiment of the secondary sun visor, having a slidable panel cooperatively linked to the secondary sun visor panel.
Figure 5B:
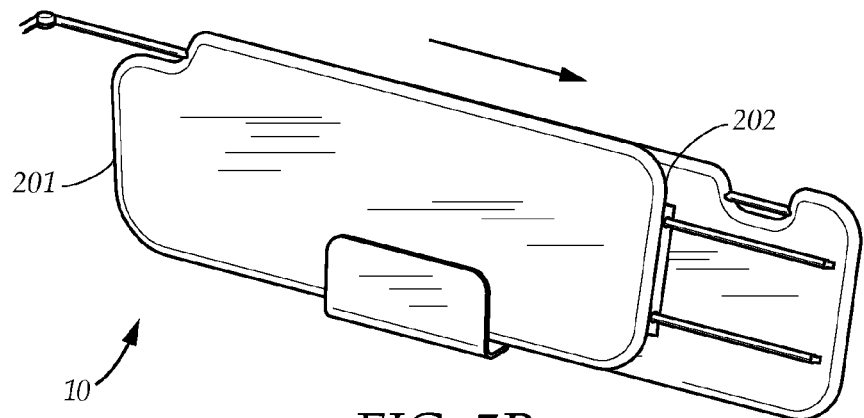
FIG. 5B is a diagrammatic perspective view, illustrating the slidable panel in an alternative position with respect to the secondary sun visor panel.
Figure 6:
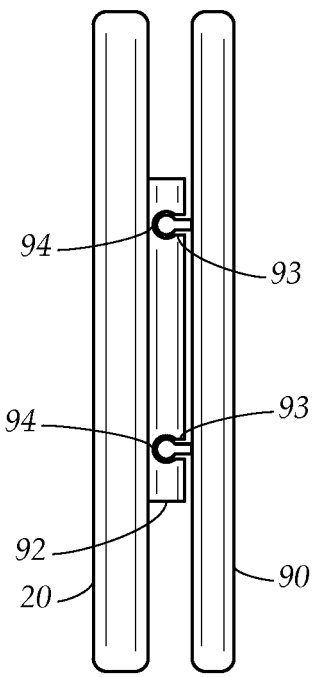
FIG. 6 is a side elevational view, illustrating interconnection between the secondary sun visor panel and slidable panel, according to an embodiment of the secondary sun visor.
Figure 7:
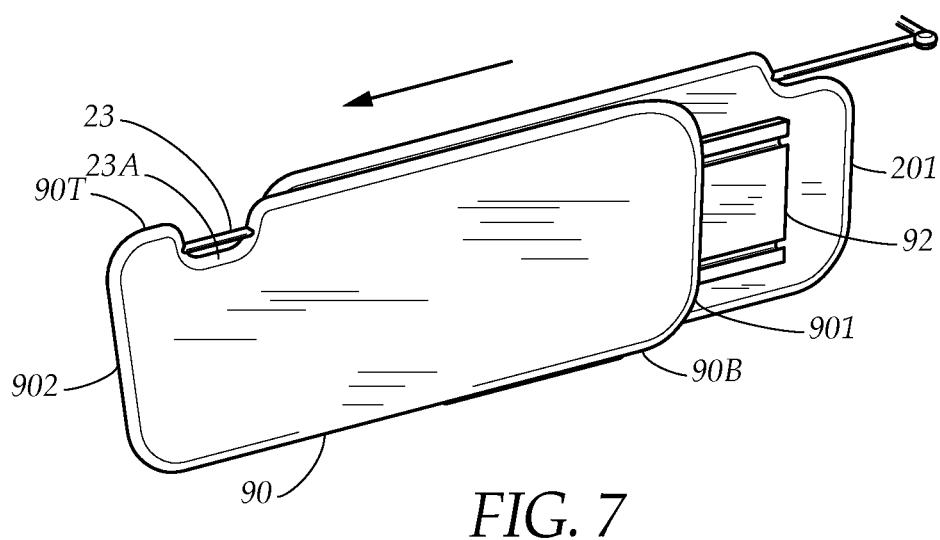
FIG. 7 is a rear elevational view, illustrating the slidable panel and its interconnection to the secondary sun visor panel.

Referring now to FIG. 4, the conventional sun visor panel 52 and the secondary sun visor panel 20 are fully deployed within a vehicle 80. The vehicle 80 has a driver's side 81, a windshield 82, a side window 84, a roof 85 (or headliner), and a door pillar 86. The vehicle 80 also has a hook 87, generally located between the windshield 82 and roof 85 or on the roof 85. In the example illustrated, the vehicle mount 64 is attached to the door pillar 86 near the roof 85 at the driver's side of the vehicle 80. The conventional sun visor panel 52 is pivoted to extend near the side window 84 to block the sun's rays extending therethrough. The secondary sun visor panel 20 has been deployed by moving the sliding collar 70 to free the secondary sun visor panel 20 from the conventional sun visor panel 52 and then pivoting the arm assembly 40 so that the first arm 41 and second arm 42 extend at an angle of approximately ninety degrees, to position the secondary sun visor panel 20 adjacent to the windshield 82 to block the sun's rays extending therethrough. Accordingly, in this position, the driver is shielded from the sun's rays as it simultaneously enters the vehicle through the side window 84 and windshield 82. Also, with the telescopic nature of the arms 41, 42, the relative position of the secondary sun visor panel 20 with respect to the primary conventional sun visor panel 52 can be further adjusted to the preferences of the user. Note that the use of the secondary sun visor panel 20 can be similarly used on a passenger's side of the vehicle to provide the same functionality to a front seat passenger (or to a driver in a right sided control vehicle). Note that conventionally (without the use of the secondary sun visor assembly 10), the hooking arm 53 of the conventional sun visor would optionally engage the hook 87 to provide additional support to the conventional sun visor panel 52. When the secondary sun visor panel 20 is deployed as illustrated, however, the hooking arm 23 of the secondary sun visor panel 20 may be engaged with the hook 87.

FIGS. 5A, 5B, 6 and 7 illustrate an embodiment wherein the secondary sun visor assembly 10 includes a movable panel 90 that is secured to the secondary sun visor panel 20, and extends substantially parallel thereto. The movable panel 90 is attached to the secondary sun visor panel 20 for lateral sliding movement with respect thereto. In particular, the secondary sun visor panel 20 has a front 20F and a rear 20R. The rear of the secondary sun visor panel 20 includes a mounting assembly 92 that includes tracks 93 secured to the rear 20R of the secondary sun visor panel 20, and rails 94 secured to the movable panel 90. The tracks 93 extend substantially parallel to each other, and the rails 94 extend substantially parallel to each other. The rails 94 engage the tracks 93 to facilitate the slidable movement of the movable panel 90 with respect to the secondary sun visor panel 20. The movable panel 90 has a top 90T, bottom 90B, a first side 901, and a second side 902. The movable panel 90 is substantially opaque between the top 90T, bottom 90B, first side 901, and second side 902, enhancing the coverage range of the secondary sun visor panel 90 when the movable panel 90 is slid beyond the first side 201 or second side 202 of the secondary sun visor panel 20. Note that in the embodiment shown, the movable panel 90 has the indenture 23A located within the top 90T, and the hooking rod 23 located within the indenture 23A. Accordingly, the hooking rod 23 can selectively engage the hook 87 (FIG. 4) when the secondary sun visor panel 20 is in its deployed position.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a secondary sun visor assembly. The disclosure is illustrated by example in the drawing figures, and throughout the written description. It should be understood that numerous variations are possible, while adhering to the inventive concept. Such variations are contemplated as being a part of the present disclosure.

What is claimed is:

1. A secondary sun visor assembly, for use with a vehicle having a windshield, a side window adjacent to the windshield, a conventional visor mounted near the windshield, the conventional visor having a top edge, comprising:
   a secondary visor panel, the secondary visor panel substantially opaque for blocking solar glare, having a top edge and a bottom edge;
   a first arm attached to the secondary visor panel and extending along its top edge, allowing pivotal movement of the secondary visor panel around the first arm;
   a second arm having a proximal end and a distal end;
   a clip attached to the distal end of the second arm, the clip having a longitudinal channel that extends substantially parallel to the second arm, adapted for attaching to the top edge of the conventional visor;
   a compound hinge attaching the proximal end of the second arm to the first arm, the compound hinge allowing the first arm and the second arm to move between a storage position where the first and second arms are substantially parallel and a deployed position where the first and second arms are approximately perpendicular, the compound hinge is adapted to allow the secondary visor panel to extend parallel to and against the conventional visor for storage and to allow the secondary visor panel to extend to cover a portion of the windshield while the conventional visor is pivoted to extend to cover a portion of the side window when the clip is attached onto the top edge of the conventional visor and the first and second arms are in the deployed position; and a collar slideably attached at the bottom edge of the secondary visor panel, the collar adapted for holding the secondary visor panel against and parallel to the conventional visor when the first and second arms are in the storage position, the collar comprising an L-shaped structure including a planar lip parallel to the secondary visor panel and a planar connecting tab substantially perpendicular to the lip, the collar slideably attached to the secondary visor panel via the tab.

2. The secondary sun visor assembly as recited in claim 1, wherein the vehicle has a hook mounted near the roof, and wherein the secondary sun visor assembly further comprises a hooking rod, for engaging the hook.

3. The secondary sun visor assembly as recited in claim 2, further comprising a movable panel, the movable panel slidably mounted to the secondary visor panel for lateral relative movement with respect thereto.

4. The secondary sun visor assembly as recited in claim 3, further comprising a mounting assembly that includes a pair of longitudinal tracks secured to the secondary sun visor panel and a pair of rails secured to the movable panel, wherein the rails extend within the tracks to facilitate slidable movement of the movable panel with respect to the secondary sun visor panel.

5. The secondary sun visor assembly as recited in claim 4, wherein the movable panel has a top edge, and wherein the hooking rod is located along the top edge of the movable panel.

6. The secondary sun visor assembly as recited in claim 1, wherein the lip, the connecting tab, and the secondary visor panel form a channel adapted to receive the conventional sun visor when in the storage position.

7. A secondary sun visor assembly, for use with a vehicle having a windshield, a side window adjacent to the windshield, a conventional visor mounted near the windshield, the conventional visor having a top edge, comprising:

a secondary visor panel, the secondary visor panel having a top edge, a bottom edge, a first side, and a second side, the secondary visor panel substantially opaque between the top edge, bottom edge, first side, and second side for blocking solar glare;

a first arm attached to the secondary visor panel and extending along its top edge, allowing pivotal movement of the secondary visor panel around the first arm;

a second arm having a proximal end and a distal end;

a clip attached to the distal end of the second arm, the clip having a longitudinal channel, adapted for attaching to the top edge of the conventional visor;

a compound hinge attaching the proximal end of the second arm to the first arm, the compound hinge allowing the first arm and the second arm to move between a storage position where the first and second arms are substantially parallel and a deployed position where the first and second arms are approximately perpendicular; and a collar slideably attached at the bottom edge of the secondary visor panel, the collar adapted for holding the secondary visor panel against and parallel to the conventional visor when the first and second arms are in the storage position, the collar comprising an L-shaped structure including a planar lip parallel to the secondary visor panel and a planar connecting tab substantially perpendicular to the lip, the collar slideably attached to the secondary visor panel via the tab.

8. The secondary sun visor assembly as recited in claim 7, further comprising a movable panel, the movable panel slidably mounted to the secondary visor panel for lateral relative movement with respect thereto.

9. The secondary sun visor assembly as recited in claim 8, further comprising a mounting assembly that includes a pair of longitudinal tracks secured to the secondary visor panel and a pair of rails secured to the movable panel, wherein the rails extend within the tracks to facilitate slidable movement of the movable panel with respect to the secondary sun visor panel.

10. The secondary sun visor assembly as recited in claim 9, wherein the vehicle has a hook mounted near the roof, and wherein the movable panel has a top edge having an indenture and a hooking rod located within the indenture adapted for selectively engaging the hook.

11. The secondary sun visor assembly as recited in claim 10, wherein the lip and the connecting tab of the collar and the secondary visor panel form a channel adapted to receive the conventional sun visor when in the storage position.

12. A secondary sun visor method, for use in a vehicle having a windshield, a side window adjacent to the windshield, a roof, and a conventional sun visor mounted near the roof, using a secondary sun visor having a first arm, a secondary visor panel mounted on the first arm, a second arm having a clip attached on one end and a compound hinge attached to the first arm on the other end, the compound hinge also attached to the second arm, comprising the steps of:

securing the clip onto the conventional sun visor;

pivoting the conventional sun visor toward the side window;

deploying the secondary sun visor by moving the secondary sun visor panel in front of the windshield by moving the first arm away from the second arm by pivoting the first arm at the compound hinge until the second arm and first arm extend at an angle of approximately ninety degrees; and storing the secondary sun visor by moving the first arm toward the second arm by pivoting the first arm at the compound hinge until the second arm and the first arm are substantially parallel, thereby pivoting the conventional sun visor toward the secondary visor panel, and securing the conventional sun visor to the secondary visor panel by receiving the conventional sun visor into a channel formed by a collar slideably attached to the secondary visor panel, the collar comprising an L-shaped structure including a planar lip parallel to the secondary visor panel and a planar connecting tab substantially perpendicular to the lip, the collar slideably attached to the secondary visor panel via the tab.

13. The secondary sun visor method as recited in claim 12, storing the secondary sun visor further comprising extending the secondary sun visor panel against the conventional sun visor by pivoting the first arm toward the second arm, and pivoting the conventional sun visor toward the windshield.

14. The secondary sun visor method as recited in claim 13, wherein the vehicle has a hook located near the roof, wherein the secondary sun visor has a hooking rod, and wherein the step of deploying the secondary sun visor further comprises engaging the hook with the hooking rod of the secondary sun visor.

* * * * *